(12) United States Patent
Kim et al.

(10) Patent No.: US 9,295,036 B2
(45) Date of Patent: Mar. 22, 2016

(54) CQI TRANSMISSION POWER CONTROL METHOD AND APPARATUS FOR WIRELESS COMMUNICATION SYSTEM SUPPORTING MULTI-CELL HSDPA

(75) Inventors: Young Bum Kim, Seoul (KR); Youn H. Heo, Gyeonggi-do (KR); Ju Ho Lee, Suwon-si (KR)

(73) Assignee: Samsung Electronics Co., Ltd (KR)

(*) Notice: Subject to any disclaimer, the term of this patent is extended or adjusted under 35 U.S.C. 154(b) by 674 days.

(21) Appl. No.: 13/130,716

(22) PCT Filed: Nov. 24, 2009

(86) PCT No.: PCT/KR2009/006946
§ 371 (c)(1),
(2), (4) Date: May 23, 2011

(87) PCT Pub. No.: WO2010/062099
PCT Pub. Date: Jun. 3, 2010

(65) Prior Publication Data
US 2011/0228756 A1    Sep. 22, 2011

(30) Foreign Application Priority Data

Nov. 25, 2008 (KR) .................. 10-2008-0117215

(51) Int. Cl.
*H04W 4/00* (2009.01)
*H04W 72/04* (2009.01)
(Continued)

(52) U.S. Cl.
CPC .......... *H04W 72/0406* (2013.01); *H04L 1/007* (2013.01); *H04L 1/0026* (2013.01);
(Continued)

(58) Field of Classification Search
CPC .......... H04W 72/0406; H04W 52/325; H04L 1/0026; H04L 1/0073; H04L 5/0048; H04L 5/0055
USPC ............. 370/329, 335, 342; 330/278; 455/68, 455/439; 375/260
See application file for complete search history.

(56) References Cited

U.S. PATENT DOCUMENTS 7,054,633 B2 *  5/2006  Seo et al. .................. 455/439
7,346,034 B2 *  3/2008  Takano et al. ............. 370/331
(Continued)

FOREIGN PATENT DOCUMENTS

| CN | 1476687 | 2/2004 |
|---|---|---|
| CN | 101233775 | 7/2008 |

(Continued)

OTHER PUBLICATIONS

Qualcomm Europe, "HS-DPCCH Design for CQI Feedback Cycle > 1", R1-082822, 3GPP TSG-RAN WG1 #54, Aug. 22, 2008.
(Continued)

*Primary Examiner* — Mark Rinehart
*Assistant Examiner* — Gbemileke Onamuti
(74) *Attorney, Agent, or Firm* — The Farrell Law Firm, P.C.

(57) ABSTRACT

A CQI transmission power control method is provided for transmitting CQIs of multiple cells is provided for a multi-cell HSDPA system in which multiple cells transmit packet data to a user equipment. A control information transmission method of a user equipment in a wireless communication system supporting multi-cell packet transmission service according to the present invention includes generating control informations indicating channel qualities of different cells; classifying the control informations into two control information groups according to a predetermined rule; compensating the control information groups for securing uniform reception performance at a base station; and transmitting the compensated control information groups to the base station.

15 Claims, 7 Drawing Sheets

(51) Int. Cl.
*H04L 1/00* (2006.01)
*H04L 5/00* (2006.01)
*H04L 1/16* (2006.01)
*H04L 1/18* (2006.01)
*H04W 24/10* (2009.01)
*H04W 52/32* (2009.01)

(52) U.S. Cl.
CPC ............ *H04L1/0073* (2013.01); *H04L 5/0048* (2013.01); *H04L 5/0055* (2013.01); *H04L 1/1607* (2013.01); *H04L 1/1812* (2013.01); *H04W 24/10* (2013.01); *H04W 52/325* (2013.01)

(56) References Cited

U.S. PATENT DOCUMENTS

| | | | |
|---|---|---|---|
| 7,564,828 B2 * | 7/2009 | Qian | 370/342 |
| 7,961,700 B2 | 6/2011 | Malladi et al. | |
| 8,219,888 B2 | 7/2012 | Chen | |
| 8,675,743 B2 * | 3/2014 | Kotecha et al. | 375/260 |
| 8,948,704 B2 * | 2/2015 | Farajidana et al. | 455/69 |
| 2002/0141367 A1 | 10/2002 | Hwang et al. | |
| 2003/0045321 A1 | 3/2003 | Kim et al. | |
| 2004/0116139 A1 | 6/2004 | Yi et al. | |
| 2005/0020260 A1 | 1/2005 | Jeong et al. | |
| 2006/0286996 A1 | 12/2006 | Julian et al. | |
| 2007/0041349 A1 * | 2/2007 | Kim et al. | 370/335 |
| 2007/0176681 A1 * | 8/2007 | Matsumoto | 330/278 |
| 2008/0051127 A1 | 2/2008 | Xu | |
| 2008/0070611 A1 | 3/2008 | Yi et al. | |
| 2009/0047911 A1 * | 2/2009 | Rao et al. | 455/68 |
| 2009/0201885 A1 | 8/2009 | Kuroda et al. | |
| 2009/0279445 A1 | 11/2009 | Nogami et al. | |
| 2011/0026478 A1 * | 2/2011 | Lee et al. | 370/329 |
| 2012/0176996 A1 * | 7/2012 | Kim et al. | 370/329 |
| 2012/0269159 A1 * | 10/2012 | Inoue et al. | 370/329 |
| 2013/0242948 A1 * | 9/2013 | Sambhwani | 370/335 |

FOREIGN PATENT DOCUMENTS

| | | |
|---|---|---|
| GB | 2 415 324 | 12/2005 |
| JP | 2002-369258 | 12/2002 |
| JP | 2008-539667 | 11/2008 |
| KR | 1020040041289 | 5/2004 |
| KR | 1020050085123 | 8/2005 |
| WO | WO 2006/043712 | 4/2006 |
| WO | WO 2007/072828 | 6/2007 |

OTHER PUBLICATIONS

Samsung, "CQI Transmission Supporting Dual-Cell HSDPA", R1-083292, 3GPP TSG RAN WG1 Meeting #54, Aug. 22, 2008.
PCT/ISA/237 Written Opinion issued on PCT/KR2009/006946 (3 pp.).
PCT/ISA/210 Search Report issued on PCT/KR2009/006946 (4 pp.).
Samsung, "CQI and ACK/NACK Transmission Supporting Dual-Cell HSDPA", R1-083562, 3GPP TSG RAN WG1 Meeting #54bis, Sep. 29-Oct. 23, 2008.
Huawei, "Discussion on the CQI Report for Dual-Cell HSDPA", R1-084180, 3GPP TSG RAN WG1 Meeting #55, Nov. 10-14, 2008.
Qualcomm Europe, "HS-DPCCH in Support of D-TxAA", R1-062031, 3GPP TSG-RAN WG1 #46, Aug. 28-Sep. 1, 2006.
Japanese Office Action dated Apr. 6, 2015 issued in counterpart application No. 2014-108098.
Korean Office Action dated Sep. 18, 2015 issued in counterpart application No. 10-2014-0025843, 13 pages.

* cited by examiner

CQI TRANSMISSION POWER CONTROL METHOD AND APPARATUS FOR WIRELESS COMMUNICATION SYSTEM SUPPORTING MULTI-CELL HSDPA

TECHNICAL FIELD

The present invention relates to wireless communications and, in particular, to a CQI transmission power control method for a wireless communication system supporting multi-cell HSDPA in which multiple cells transmit packet data to a user equipment.

BACKGROUND ART

Universal Mobile Telecommunications System (UMTS), which is one of the third generation (3G) mobile telecommunication technologies based on the Wideband Code Division Multiple Access (WCDMA), has evolved from Global System for Mobile communications (GSM) and General Packet Radio Services (GPRS) for providing mobile and computer users with packet-based multimedia services including text messaging and voice and video communication services in a consistent service environment.

The UMTS system supports High Speed Downlink Packet Data Access (HSDPA) service to enhance the packet data transfer speed and capacity in downlink.

In order to secure high speed data transfer rate, HSDPA uses Adaptive Modulation and Coding (AMC) and Hybrid Automatic Repeat Request (HARQ). With the AMC, the Quadrature Phase-Shift Keying (QPSK), 16 Quadrature Amplitude Modulation (16QAM), and 64QAM modulation schemes are selectively used. The AMC technique selects the modulation scheme and coding format and coding rate on the basis of the channel condition and channel type between the Base station and the user equipment (UE) so as to improve the entire cell throughput.

HARQ is implemented with fast retransmission and soft combining techniques. When an erroneous packet is detected, the retransmission is triggered between the base station and UE, and the recipient part combines the retransmitted packet with the previously received packets, thereby reducing the number of retransmission requests to improve overall efficiency. In order to support the HSDPA service, the base station and UE exchange control information such as Orthogonal Variable Spreading Factor (OVSF) codes and number of OVSF codes, Transport Block Sixe (TBS), Modulation and Coding Scheme (MCS), channel index information for HARQ, Channel Quality Indicator (CQI) for indicating the channel condition, and HARQ ACK/NACK.

Figure 1:
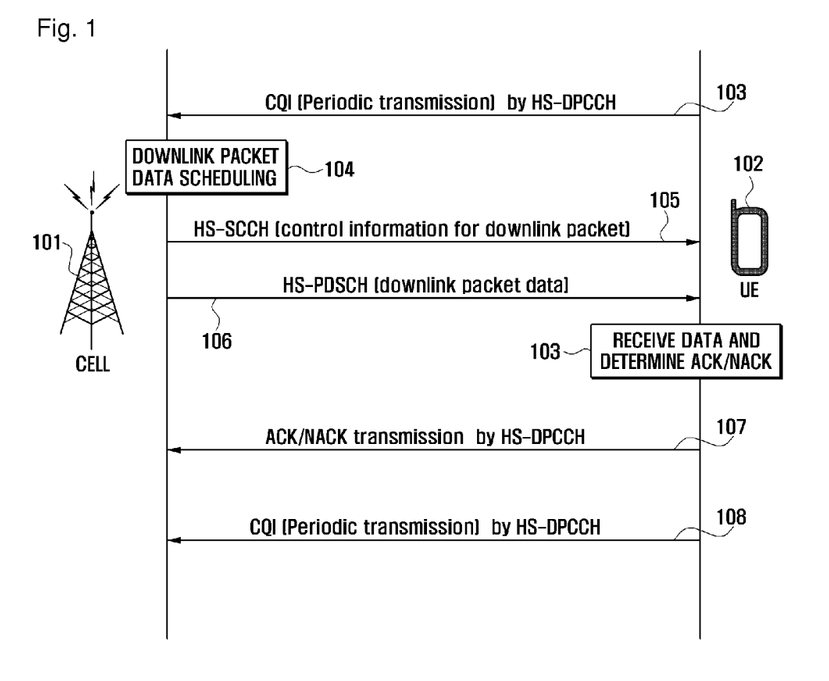
FIG. 1 is a sequence diagram illustrating operations of a cell and a UE in HSDPA system.

FIG. 1 is a sequence diagram illustrating operations of a cell and a UE in HSDPA system.

Referring to FIG. 1, first the UE 102 transmits a Channel Quality Indicator (hereinafter called CQI) to a cell 101. Since the UE 102 does not know when the data are transmitted in downlink, it transmits the CQI information periodically (103). When there are data to be sent, the Node B 101 performs scheduling based on the CQI. In the scheduling process, the Node B determines a number of code channels available for allocation and an MCS level. Such information is transmitted to the UE 102 through a High Speed Shared Control Channel (HS-SCCH) (105). The HS-SCCH is received by the UE 102 in TTI, and the UE 102 receives data by demodulating the HS-PDSCH 106 with reference to the HS-SCCH. In order to make a status report for Hybrid Automatic Repeat Request (HARM), the UE 102 performs Cyclic Redundancy Check (CRC) to determine Acknowledgement/Non-Acknowledgement (ACK/NACK) (103). If the data are received in error, the UE 102 transmits a NACK to Node B 101 to request retransmission of the data; and otherwise, an ACK to Node B 101 (107). The status reports of ACK/NACK and CQI are transmitted through a High Speed Dedicated Physical Control Channel (HS-DPCCH).

Figure 2:
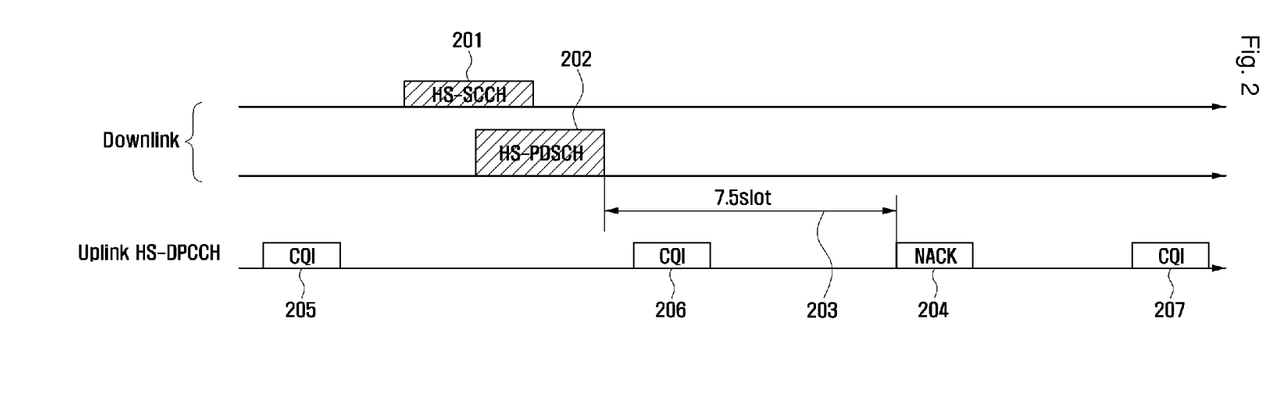
FIG. 2 is a timing diagram illustrating transmissions of the physical channels of an HSDPA system.

FIG. 2 is a timing diagram illustrating transmissions of the physical channels of an HSDPA system. As shown in FIG. 2, the CQIs 205, 206, and 207 are periodically transmitted via the HS-DPCCH. Node B transmits two slots of the HS-SCCH before it begins transmitting the HS-PDSCH in order for the UE to check the information on the demodulation of the HS-PDSCH. The ACK/NACK information 204 is transmitted 7.5 slots 203 after the transmission of the HS-PDSCH 202 in consideration of the demodulation and decoding of the data carried by the HS-PDSCH.

Figure 3:
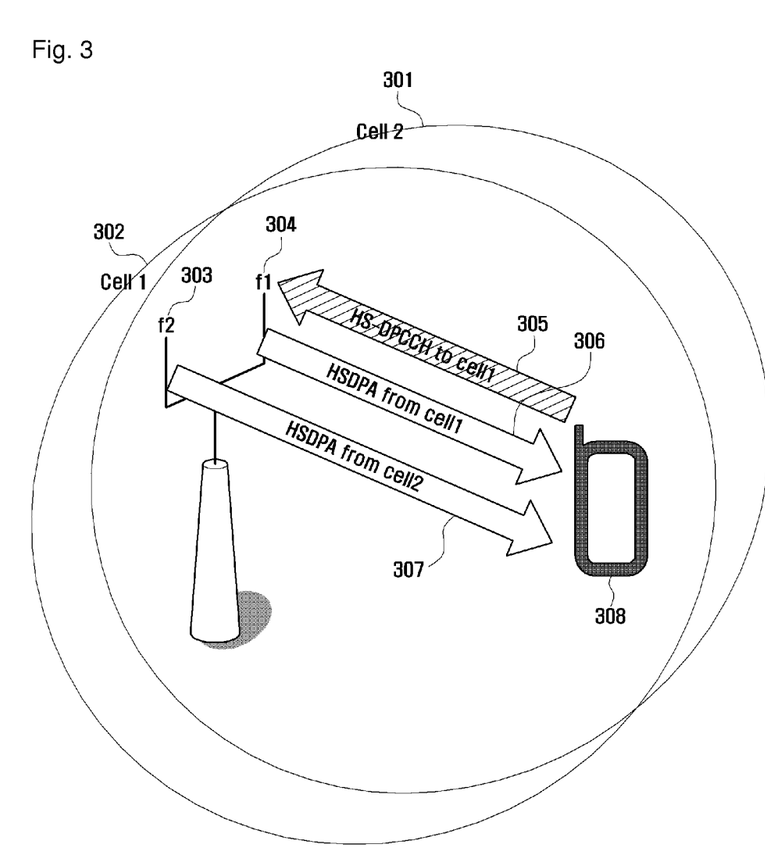
FIG. 3 is a conceptual diagram illustrating a Dual-Cell HSDPA service of a UMTS system.

The Dual-Cell HSDPA operation is described hereinafter with reference to FIG. 3. Unlike the conventional HSDPA in which the UE measures received signals strengths of the cells and connects to the most appropriate cell based on the measurements, the Dual-Cell HSDPA is characterized in that the UE 308 connects to two different cells 301 and 302 defined by two different carriers 303 and 304 of a Node B. The UE 308 receives the HSDPA signals from the second cell 302 in the first carrier f1 304 and from the first cell 301 in the second carrier f2 303, simultaneously. In the WCDMA system, the transmission bandwidth of a cell is 5 MHz such that the UE must have a reception capability of 10 MHz for supporting Dual-Cell HSDPA. Since the HSDPA signals are received from two cells, the maximum transmission rate increases twice. In case of uplink, however, the Dual-Cell transmission function is not supported, whereby the uplink channel is transmitted to only one cell. Even in downlink transmission, common and dedicated channels that are not related to the HSDPA are received from a single cell. Typically, the cell which is in charge of controlling the uplink channel and common and dedicated downlink channels is called "anchor cell" and the other cell is called "supplementary cell".

Although the 3GPP standard specifies the Dual-Cell HSDPA service with two cells (including one anchor cell and one supplementary cell) as of year 2008, a multi-cell HSDPA can be implemented with the involvement of more than two cells (including one anchor cell and two or more supplementary cells).

In order for the Dual-Cell HSDPA service to support the HARQ and AMC, the ACK/NACK and CQI should be transmitted to the respective cells, whereby the uplink channel permitted to the anchor cell must be configured to carry the ACK/NACKs and CQIs destined for the anchor and supplementary cells. In this case, the CQIs for the anchor and supplementary cells (each is 5-bit long) are concatenated into 10-bit control information and encoded with a (20, 10) block code. The block coded control information is transmitted through the HS-DPCCH specified for the CQI and ACK/NACK transmission. In case that the Dual-Cell HSDPA operation is not configured, the 5-bit CQI for the anchor cell is encoded with a (20, 5) block code and then transmitted through the HS-DPCCH specified for the CQI and ACK/NACK transmission. The Dual-Cell HSDPA operation is signaled by the base station to the UE.

However, detailed uplink control information transmission method for the multi-cell HSDPA has not been discussed yet until now.

DISCLOSURE OF INVENTION

Technical Problem

In order to overcome the problems of the prior art, the present invention provides a method for controlling transmission power of the physical control channel carrying the CQIs for multiple cells in a multi-cell HSDPA system that is capable of securing uniform CQI reception performance.

Solution to Problem

In accordance with an exemplary embodiment of the present invention, a control information transmission method of a user equipment in a wireless communication system supporting multi-cell packet transmission service includes generating control informations indicating channel qualities of different cells; classifying the control informations into two control information groups according to a predetermined rule; compensating the control information groups for securing uniform reception performance at a base station; and transmitting the compensated control information groups to the base station.

In accordance with another exemplary embodiment of the present invention, a user equipment for a multi-cell transmission system in which N cells transmit packet data using different frequencies includes a Channel Quality Indicator (CQI) generator which measures CQIs of the cells and generates control informations corresponding to the CQIs; a CQI controller which classifies the control informations into different control information groups according to a predetermined rule and compensates the control information groups for securing uniform reception performance at a base station; and a control channel transmitter which transmits the compensated control informations to the base station.

In accordance with another exemplary embodiment of the present invention, a control information reception method of a base station for a multi-cell transmission system in which N cells transmit packet data using different frequencies includes determining whether a control information feedback cycle starts; receiving, if the control information feedback cycle starts, control information groups including control informations related to the cells; and acquiring channel qualities of the cells by decoding the received control information.

In accordance with still another exemplary embodiment of the present invention, a base station for a multi-cell transmission system in which N cells transmit packet data using different frequencies includes an uplink control channel receiver which receives control information groups including control informations transmitted by a user equipment during a feedback cycle; a Channel Quality Indicator (CQI) extractor which extracts CQIs by decoding the control informations of the cells; and a scheduler which performs scheduling on the cells using the CQIs extracted by the CQI extractor.

Advantageous Effects of Invention

The CQI transmission power control method for a wireless communication system providing multi-cell HSDPA service is advantageous to secure the uniform reception performance for multiple cells at the base station by controlling the transmission powers of the uplink physical control channels carrying the CQI information, resulting in improvement of CQI transmission efficiency and system performance.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the following description, the CQI transmission power control method of the present invention is directed to the multi-cell HSDPA system in which multiple (N) cells are transmitting the HSDPA service data simultaneously, but the principle of the present invention can be applied to similar types of communication systems.

In an exemplary embodiment of the present invention, the CQI transmission power control method of the present invention is described with an exemplary multi-cell HSDPA system in which N=3, and a UE transmits three 5-bit CQIs, i.e. a CQI(1) for an anchor cell, a CQI(2) for a first supplementary cell, a CQI(3) for a second supplementary cell, simultaneously while securing the uniform CQI reception performance. For this purpose, the UE generates a group of CQIs according to a predetermined rule and compensates the control information on the group to secure the reception performance at the base station.

In more detail, the UE designates the CQI(1) as a first group and the CQI(2) and CQI(3) as a second group, and performs block coding on the CQI(1) with a first channel code. In an exemplary embodiment of the present invention, the first channel code is (20, 5) block code. Unless otherwise noted, the first channel code is (20, 5) block code in the following description. The UE encodes the CQI(1) with the (20, 5) block code and transmits the encoded control information through an HS-DPCCH1 which is the HS-DPCCH defined for carrying the CQI and ACK/NACK information.

The UE also concatenates the CQI(2) and CQI(3) as the second group into 10-bit control information and encodes the second group control information with a second channel code. In an exemplary embodiment of the present invention, the second channel code is (20, 10) block code. Unless otherwise noted, the second channel code is (20, 10) block code in the following description. The UE encodes the CQI(2) and CQI(3) with the (20, 10) block code and transmits the encoded control information through a HS-DPCCH2.

Which control information among the CQI(1), CQI(2), and CQI(3) is encoded with which of the (20, 5) and (20, 10) is determined according to a predetermined rule. The HS-DPCCH1 and HS-DPCCH2 are differentiated by orthogonal codes.

The larger the minimum distance (d_min) as a metric of channel coding performance is or the lower the coding rate is, the superior the error correction performance. Accordingly, the (20, 5) block code is superior to the (20, 10) in error correction capability. In literatures, d_min is 9 in the (20, 5) block code and 6 in the (20, 10) block code. Thus, when the (20, 5) coded bits for the HS-DPCCH1 and the (20, 10) coded bits for the HS-DPCCH2 are transmitted without additional calibration, the reception performance of the CQI(1) transmitted on the HS-DPCCH1 is superior to that of the CQI(2) and CQI(3) transmitted on the HS-DPCCH2 at the base station.

In an exemplary embodiment of the present invention, the UE sets the transmission power of the HS-DPCCH2 to be higher than that of the HS-DPCCH1 in order to secure the uniform CQI reception performance at the cells involved in the multi-cell HSDPA service. The transmission power offset can be preset or signaled from the base station to the UE. Detailed operations of the CQI transmission power control method is described with exemplary embodiments of the present invention. All the description is focused on the multi-cell HSDPA system in which three cells (N=3) are involved in the HSDPA service, the CQI transmission power control method of the present invention is applicable to the multi-cell HSDPA system operating with more than three cells.

In the following description, a CQI transmission power control method for a multi-cell HSDPA system operating with three cells is described as an exemplary case.

Figure 4:
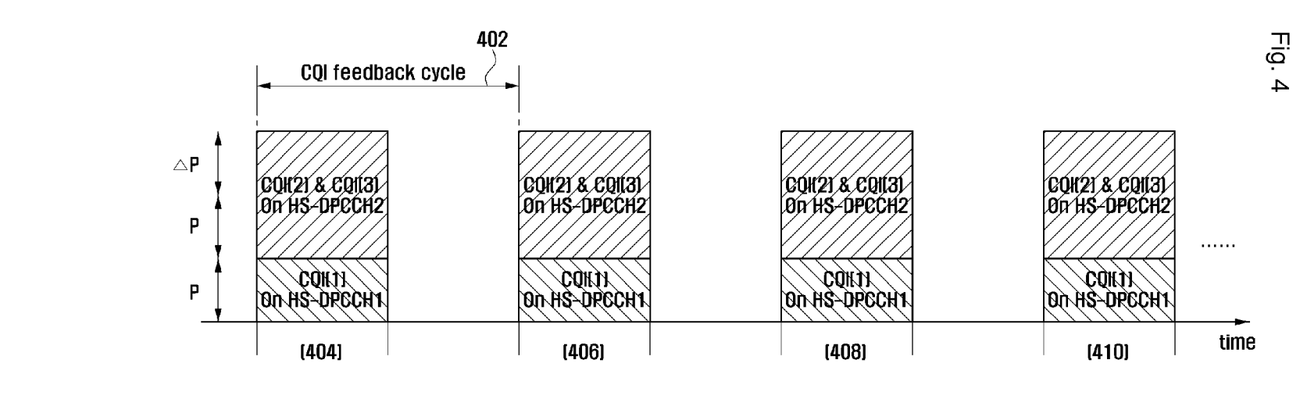
FIG. 4 is a conceptual diagram illustrating a principle of a CQI transmission power control method for a multi-cell HSDPA system according to an exemplary embodiment of the present invention.

FIG. 4 is a conceptual diagram illustrating a principle of a CQI transmission power control method for a multi-cell HSDPA system according to an exemplary embodiment of the present invention.

In the exemplary embodiment of FIG. 4, the UE transmits a 5-bit CQI(1) for the anchor cell, a 5-bit CQI(2) for a first supplementary cell, and a 5-bit CQI(3) for a second supplementary cell simultaneously. In this case, the UE encodes the CQI(1) with (20, 5) block code and transmits the 20 coded bits through the HS-DPCCH1 defined in the standard for transmission of CQI and HARQ ACK/NACK. At the same time, the UE concatenates the CQI(2) and CQI(3) into 10-bit control information, encodes the 10-bit control information with (20, 10) block code, and transmits the 20 coded bits through a newly introduced HS-DPCCH2. This means that the HS-DPCCH1 is coded with a channel code having a relatively high error correction capability and the HS-DPCCH2 is coded with a channel code having a relatively low error correction capability. The block code to be used for encoding each of the CQI(1), CQI(2), and CQI(3) is determined according to a predetermined rule. The HS-DPCCH1 and HS-DPCCH2 are distinguished by orthogonal codes. The CQI information is transmitted during a CQI feedback cycle 402 periodically.

In an exemplary embodiment of the present invention, the transmission power of the HS-DPCCH2 is set with an offset as much as GP greater than that of the HS-DPCCH1 to secure the uniform CQI reception performance at the entire cells involve in the multi-cell HSDPA service with bias to a specific cell. That is, when the transmission power of the HS-DPCCH is P, the transmission power of the HS-DPCCH2 is set to P+GP. The transmission power offset can be preset or signaled from the system to the UE.

The 3GPP standard TS25.212 specifies the (20, 5) block code and (20, 10) block code for HSDPA. The (20, 5) code for encoding CQI in HSDPA uses 5 basis sequences as shown in table 1.

TABLE 1

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

The (20, 5) channel encoding is performed by linear combination of the 5 input information bits with the 5 basis sequences of length 20 as shown in table 1 using equation (1):

$$b_i = \sum_{n=0}^{4} (a_n \times M_{i,n}) \bmod 2 \quad (1)$$

where $a_n$ is $n^{th}$ information bit ($a_0$ the Least Significant Bit (LSB), and $a_4$ is the Most Significant Bit (MSB)), and $b_i$ is $i^{th}$ output bit, i.e. $i^{th}$ coded bit. Accordingly, the 5 information bits are encoded into 20 coded bits.

The (20, 10) code 10 basis sequences as shown in table 2

TABLE 2

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 |
| 2 | 0 | 0 | 0 | 1 | 0 | 0 | 0 | 0 | 0 | 0 | 0 |
| 3 | 0 | 0 | 0 | 0 | 1 | 0 | 0 | 0 | 0 | 0 | 0 |
| 4 | 0 | 0 | 0 | 0 | 0 | 1 | 0 | 0 | 0 | 0 | 0 |
| 5 | 0 | 0 | 0 | 0 | 0 | 0 | 0 | 1 | 0 | 0 | 0 |
| 6 | 0 | 0 | 0 | 0 | 0 | 0 | 0 | 0 | 1 | 0 | 1 |
| 7 | 0 | 0 | 0 | 0 | 0 | 0 | 0 | 0 | 0 | 1 | 1 |
| 8 | 1 | 0 | 1 | 0 | 0 | 0 | 1 | 1 | 1 | 0 | 1 |
| 9 | 1 | 1 | 0 | 1 | 0 | 0 | 0 | 1 | 1 | 1 | 1 |
| 10 | 0 | 1 | 1 | 0 | 1 | 0 | 0 | 0 | 1 | 1 | 1 |
| 11 | 1 | 0 | 1 | 1 | 0 | 1 | 0 | 0 | 0 | 1 | 0 |
| 12 | 1 | 1 | 0 | 1 | 1 | 0 | 1 | 0 | 0 | 0 | 0 |
| 13 | 1 | 1 | 1 | 0 | 1 | 1 | 0 | 1 | 0 | 0 | 0 |
| 14 | 0 | 1 | 1 | 1 | 0 | 1 | 1 | 0 | 1 | 0 | 1 |
| 15 | 0 | 0 | 1 | 1 | 1 | 0 | 1 | 1 | 0 | 1 | 0 |
| 16 | 0 | 0 | 0 | 1 | 1 | 1 | 0 | 1 | 1 | 0 | 1 |
| 17 | 1 | 0 | 0 | 0 | 1 | 1 | 1 | 0 | 1 | 1 | 1 |
| 18 | 0 | 1 | 0 | 0 | 0 | 1 | 1 | 1 | 0 | 1 | 0 |
| 19 | 1 | 1 | 1 | 1 | 1 | 1 | 1 | 1 | 1 | 1 | 1 |

The (20, 10) channel encoding is performed by linear combination of the 10 input information bits with the 10 basis sequences of length 20 as shown in table 2 using equation (2):

$$b_i = \sum_{n=0}^{9} (a_n \times M_{i,n}) \bmod 2 \quad (2)$$

where $a_n$ is $n^{th}$ information bit $(a_0$ is the Least Significant Bit (LSB), and $a_4$ is the Most Significant Bit (MSB)), and $b_i$ is ith output bit, i.e. ith coded bit. Accordingly, the 10 information bits are encoded into 20 coded bits.

Figure 5:
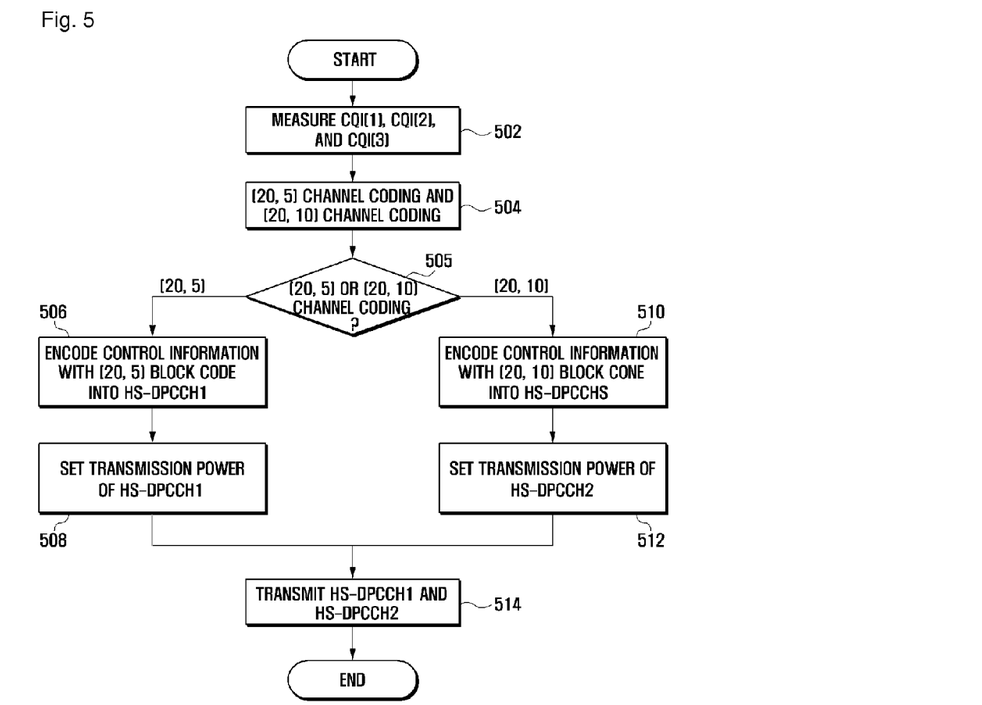
FIG. 5 is a flowchart illustrating a CQI transmission power control method for a multi-cell HSDPA system according to an exemplary embodiment of the present invention.

FIG. 5 is a flowchart illustrating a CQI transmission power control method for a multi-cell HSDPA system according to an exemplary embodiment of the present invention.

Referring to FIG. 5, the UE first measures the Common Pilot Channels (CPICHs) of the anchor cell and the first and second supplementary cells to generate the CQI(1), CQI(2) and CQI(3) indicating channel statuses and MCS levels of the corresponding cells (502). At this time, the UE can classify the CQIs into a first CQI information group and a second CQI information group according to a predetermined rule. Next, the UE encodes one (the first CQI information group) of the three CQIs with (20, 5) block code and concatenates the rest two CQIs and then encodes the concatenated CQIs (the second CQI information group) with (20, 10) block code (504). The channel codes for encoding the CQIs are determined according to a predetermined rule.

For instance, it is possible to assign a serial number (1, 2, and 3) to the respective cells and concatenate the CQIs of the cells assigned the first two serial numbers to be encoded with (20, 10) block code and then encode the CQI of the cell assigned the last serial number with (20, 5) block code. Also, it is possible to encode the CQI of the anchor cell with (20, 5) block code and concatenates and encodes the CQIs of the rest two supplementary cells with (20, 10) block code.

In an exemplary embodiment of the present invention, the UE classifies the one of the CQIs into a first CQI group information and the rest two CQIs into a second CQI group information.

Next, the UE checks the block code used for channel coding on the coded CQI information (505). If the CQI information is coded using (20, 5) block code, the UE spreads the coded bits over the HS-DPCCH1 as the first CQI dedicated physical control channel (506) and sets the transmission power of the HS-DPCCH1 to P (508).

If the CQI information is coded using (20, 10) block code, the UE spreads the coded bits over the HS-DPCCH2 as the second CQI dedicated physical control channel (510) and sets the transmission power of the HS-DPCCH2 to P+ΔP (512). The HS-DPCCH1 and HS-DPCCH2 are distinguished by different orthogonal codes. Finally, the UE transmits the HS-DPCCH1 and HS-DPCCH2 (514).

Table 3 shows the Transport Block Size (TBS), modulation scheme, and a number of HS-DPCCHs corresponding to each of CQI values specified for the current HSDPA system. For instance, the UE retrieves a CQI value corresponding to the measured channel quality of each channel from table 1 and transmits the selected CQI value to the base station through the above described procedure.

TABLE 3

| CQI value | Transport Block Size | Number of HS-PDSCH | Modulation |
|---|---|---|---|
| 0 | N/A | Out of range | |
| 1 | 136 | 1 | QPSK |
| 2 | 176 | 1 | QPSK |
| 3 | 232 | 1 | QPSK |
| 4 | 320 | 1 | QPSK |
| 5 | 376 | 1 | QPSK |
| 6 | 464 | 1 | QPSK |
| 7 | 648 | 2 | QPSK |
| 8 | 792 | 2 | QPSK |
| 9 | 928 | 2 | QPSK |
| 10 | 1264 | 3 | QPSK |
| 11 | 1488 | 3 | QPSK |
| 12 | 1744 | 3 | QPSK |
| 13 | 2288 | 4 | QPSK |
| 14 | 2592 | 4 | QPSK |
| 15 | 3328 | 5 | QPSK |

TABLE 3-continued

| CQI value | Transport Block Size | Number of HS-PDSCH | Modulation |
|---|---|---|---|
| 16 | 3576 | 5 | 16-QAM |
| 17 | 4200 | 5 | 16-QAM |
| 18 | 4672 | 5 | 16-QAM |
| 19 | 5296 | 5 | 16-QAM |
| 20 | 5896 | 5 | 16-QAM |
| 21 | 6568 | 5 | 16-QAM |
| 22 | 7184 | 5 | 16-QAM |
| 23 | 9736 | 7 | 16-QAM |
| 24 | 11432 | 8 | 16-QAM |
| 25 | 14424 | 10 | 16-QAM |
| 26 | 15776 | 10 | 64-QAM |
| 27 | 21768 | 12 | 64-QAM |
| 28 | 26504 | 13 | 64-QAM |
| 29 | 32264 | 14 | 64-QAM |
| 30 | 32264 | 14 | 64-QAM |

Figure 6:
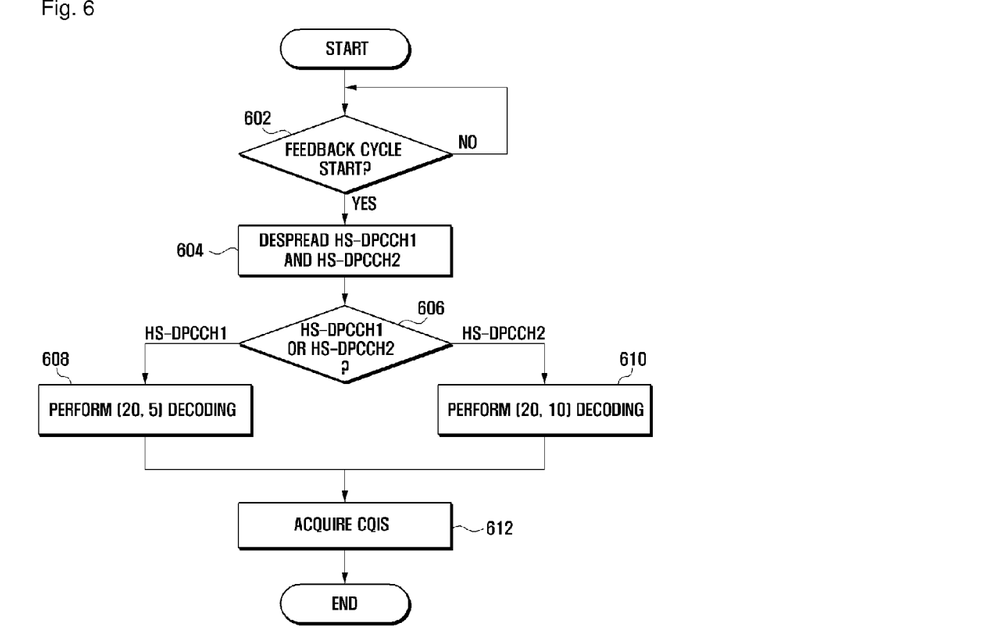
FIG. 6 is a flowchart illustrating a CQI reception procedure of the CQI transmission power control method in the base station according to an exemplary embodiment of the present invention.

FIG. 6 is a flowchart illustrating a CQI reception procedure of the CQI transmission power control method in the base station according to an exemplary embodiment of the present invention. Typically, the multi-cell HSDPA system is implemented with the anchor cell and the supplementary cells belonged to the same base station.

Referring to FIG. 6, first the base station determines whether the CQI feedback cycle is started (602). If the CQI feedback cycle is not started yet, the base station waits for the start of the CQI feedback cycle while checking periodically. If the CQI feedback cycle is started, the base station despreads the HS-DPCCH1 and HS-DPCCH2 using the corresponding orthogonal codes (604). Next, the base station distinguishes the HS-DPCCH1 and the HS-DPCCH2 from each other (606). Once the HS-DPCCH1 and the HS-DPCCH2 are identified, the base station performs decoding on the HS-DPCCH1 with (20, 5) block code (608) and the HS-DPCCH2 with (20, 10) block code (610). As a consequence, the base station acquires the CQIs transmitted on the HS-DPCCH1 and the HS-DPCCH2 (612).

Figure 7:
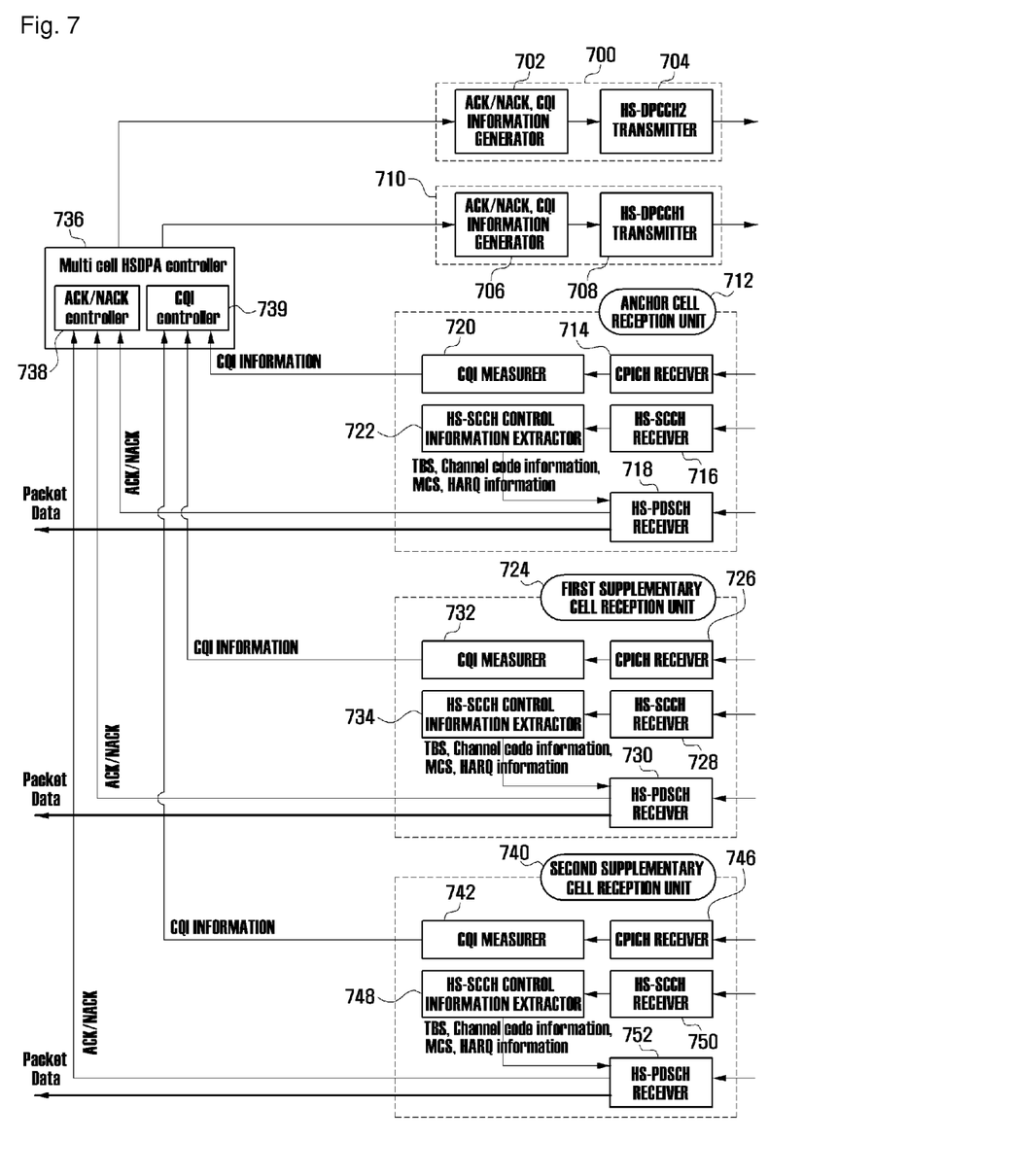
FIG. 7 is a block diagram illustrating a configuration of a UE for supporting the multi-cell HSDPA according to an exemplary embodiment of the present invention.

FIG. 7 is a block diagram illustrating a configuration of a UE for supporting the multi-cell HSDPA according to an exemplary embodiment of the present invention.

As shown in FIG. 7, the UE includes an anchor cell reception unit 712, a first supplementary cell reception unit 724, a second supplementary cell reception unit 740, a first feedback unit 710, a second feedback unit 700, and a multi-cell HSDPA control unit 736.

The anchor cell reception unit 712 includes a CPICH receiver 714, an HS-SCCH receiver 716, an HS-PDSCH receiver 718, a CQI measurer 720, and a HS-SCCH control information extractor 722.

The first supplementary cell reception unit 724 includes a CPICH receiver 726, an HS-SCCH receiver 728, an HS-PDSCH receiver 730, a CQI measurer 732, and a HS-SCCH control information extractor 734.

The second supplementary cell reception unit 740 includes a CPICH receiver 746, an HS-SCCH receiver 750, an HS-PDSCH receiver 752, a CQI measurer 742, and a HS-SCCH control information extractor 748.

The first feedback unit 710 includes a feedback information generator 706 and an HS-DPCCH1 transmitter 708.

The second feedback unit 700 includes a feedback information generator 702 and an HS-DPCCH2 transmitter 704.

The multi-cell HSDPA control unit 736 includes an ACK/NACK controller 738 and a CQI controller 739.

The HS-SCCH receivers 716, 728, and 750 despread, demodulate, and decode the HS-SCCHs received from the corresponding cells.

The HS-SCCH control information extractors 722, 734, and 748 extract information on the HS-PDSCHs (including TBS, channel code information and number, MCS, and HARQ information) from the decoding results output by the corresponding HS-SCCH receivers 716, 728, and 750 and supports the HS-PDSCH reception operations of the HS-PDSCH receivers 718, 730, and 752.

The HS-PDSCH receivers 718, 730, and 752 despread, demodulate, and decode the packet data received from the corresponding cells and output the decoded packet data to the ACK/NACK controller 738 for CRC tests.

The CPICH receivers 714, 726, and 746 receive the CPICH signals transmitted by corresponding cells and output the received CPICH signals to the corresponding CQI measurers 720, 732, and 742.

The CQI measurers 720, 732, and 742 acquire the channel quality information of the corresponding cells from the CPICH signals and generate control information based on the channel quality information. For this purpose, the CQI measurers 720, 732, and 742 measure the received signal qualities of the CPICH signals output by the CPICH receivers 714, 726, and 746 and then provides the measured signal qualities to the CQI controller 739.

The ACK/NACK controller 738 of the multi-cell HSDPA control unit 736 performs CRC tests on the received packet data and determines transmission of ACK/NACK to the corresponding cells.

The CQI controller 739 controls the first and second feedback units 710 and 700 to transmit the CQI(1), CQI(2), and CQI(3) for the anchor cell and the first and second cells simultaneously. The CQI controller 739 controls the first and second feedback units 710 and 700 to group the control information for the corresponding cells according to a predetermined rule and adjust the transmission power of the group control information to secure uniform reception performance at the base station.

As aforementioned, the first feedback unit 710 includes the feedback information generator 706 and the HS-DPCCH1 transmitter 708, and the second feedback unit 700 includes the feedback information generator 702 and the HS-DPCCH2 transmitter 704. In an exemplary embodiment of the present invention, the HS-DPCCH1 transmitter 708 encodes the 5-bit CQI information for one cell using (20, 5) block code, and the HS-DPCCH2 transmitter 704 encodes the 10-bit CQI information for two cells using (20, 10) block code. The first and second feedback units 710 and 700 set the transmission powers of the HS-DPCCH1 transmitter and the HS-DPCCH2 transmitter to different values. For instance, the first feedback unit 710 sets the transmission power of the HS-DPCCH1 transmitter 708 to P, and the second feedback unit 700 sets the transmission power of the HS-DPCCH2 transmitter 704 to P+P.

Figure 8:
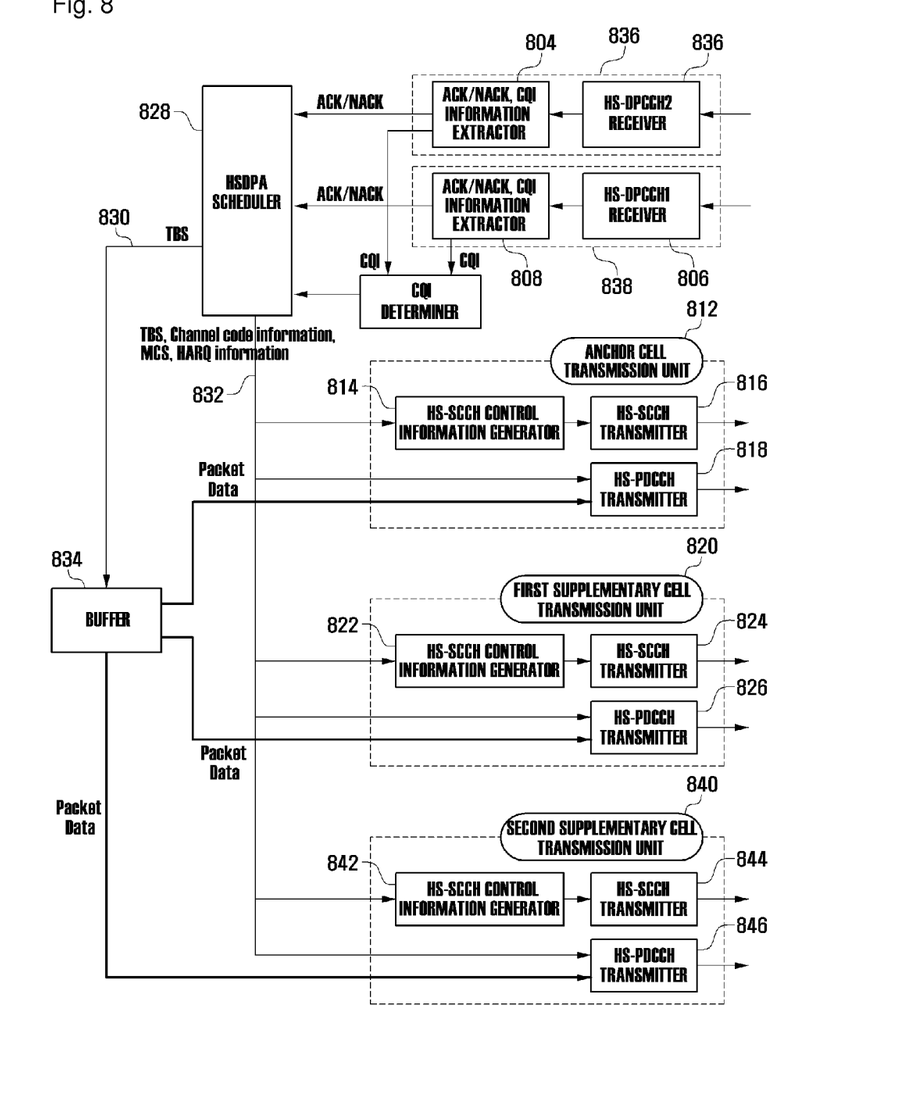
FIG. 8 is a block diagram illustrating a configuration of a base station for supporting the multi-cell HSDPA according to an exemplary embodiment of the present invention.

FIG. 8 is a block diagram illustrating a configuration of a base station for supporting the multi-cell HSDPA according to an exemplary embodiment of the present invention. In the exemplary embodiment of FIG. 8, a common buffer and a common scheduler for processing three cells are used to facilitate the multi-cell HSDPA service.

As shown in FIG. 8, the base station includes an anchor cell transmission unit 812, a first supplementary cell transmission unit 820, a second supplementary cell transmission unit 840, a first feedback reception unit 838, a second feedback reception unit 836, an HSDPA scheduler 828, a buffer 834, and a CQI determiner 810.

The anchor cell transmission unit 812 includes a HS-SCCH control information generator 814, a HS-SCCH transmitter 816, and a HS-PDCCH transmitter 818.

The first supplementary transmission unit 820 includes a HS-SCCH control information generator 822, a HS-SCCH transmitter 824, and a HS-PDCCH transmitter 826.

The second supplementary transmission unit 840 includes a HS-SCCH control information generator 842, a HS-SCCH transmitter 844, and a HS-PDCCH transmitter 846.

The first feedback reception unit 838 includes an HS-DPCCH1 receiver 806 and a feedback information extractor 808.

The second feedback reception unit 836 includes an HS-DPCCH2 receiver 802 and a feedback information extractor 804.

The first and second feedback reception unit 838 and 836 receive the feedback information including ACK/NACK and CQIs transmitted by the UE. The HS-DPCCH2 is transmitted with the transmission power greater than that of the HS-DPCCH1, and the HS-DPCCH1 carries the information coded with a channel code superior to that used for coding the HS-DPCCH2, thereby securing uniform CQI reception performance on the respective physical control channel.

The HS-DPCCH1 receiver 806 and the HS-DPCCH2 receiver 802 despread, demodulate, and decode the respective HS-DPCCH1 and HS-DPCCH 2 and output the decoded information to the corresponding feedback information extractors 808 and 804.

The first and second feedback information extractors 808 and 804 extracts the ACK/NACK and CQI information for the respective cells from the decoded information output by the HS-DPCCH1 receiver 806 and the HS-DPCCH2 receiver 802 and outputs the ACK/NACK information to the HSDPA scheduler 802 and the CQI information to the CQI determiner 810. The CQI determiner 810 calculates the CQI values for the respective cells base on the CQI information provided by the first and second feedback reception units 838 and 836 and outputs the CQI values to the HSDPA scheduler 828.

The HSDPA scheduler 820 determines the TBS, channel code of the HS-PDSCH and number of channel codes, MCS, and HARQ information based on the ACK/NACK and CQI information provided by the first and second feedback reception units 838 and 836 and the CQI determiner 810. The HSDPA scheduler 828 generates the packet data into the buffer 834 to be supplied to the HS-PDCCH transmitters 818, 826, and 846. The HSDPA scheduler 828 also provides the information on the TBS, channel code of the HS-PDSCH and number of channel code, MCS, and HARQ information to the HS-DPSCH transmitters 818, 826, and 846 such that the HS-PDSCH transmitters 818, 826, and 846 transmit the packet data based on the information provided by the HSDPA scheduler 828.

The HSDPA scheduler 828 also sends the control information to the HS-SCCH control information generators 814, 822, and 842 such that the control information is processed into appropriate format by the HS-SCCH control information generators 814, 822, and 842 and then transmitted by means of the HS-SCCH transmitters 816, 824, and 844. The number of the HS-SCCH control information generators corresponds to the number of the cells involved in the multi-cell HSDPA service.

As described above, the CQI transmission power control method for a wireless communication system providing multi-cell HSDPA service is capable of controlling the transmission powers of the uplink physical control channels carrying the CQI information so as to secure the uniform reception performance for multiple cells at the base station, resulting in improvement of CQI transmission efficiency and system performance.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A control information transmission method of a user equipment in a wireless communication system supporting multi-cell packet transmission service, comprising:
   receiving pilot signals for different cells;
   generating, by the user equipment, at least two control information indicating channel qualities for the different cells based on the received pilot signals;
   classifying the at least two control information into two control information groups according to a predetermined rule;
   separately controlling transmission power of each of the control information groups based on a number of information bits of each of the control information groups; and
   transmitting each of the power controlled control information groups on a different corresponding channel.

2. The control information transmission method of claim 1, wherein controlling the transmission power of each of the control information groups comprises setting a transmission power of one of the control information groups of which an error correction capability is less than an error correction capability of another control information group, to a value greater than the transmission power of the another control information group.

3. The control information transmission method of claim 1, wherein classifying the at least two control information comprises grouping one of the at least two control information into a first control information group and the rest of the at least two control information into a second control information group.

4. The control information transmission method of claim 1, wherein the control information groups are transmitted based on at least one control information feedback cycle.

5. A control information reception method of a base station for a multi-cell transmission system in which N cells transmit packet data using different frequencies, comprising:
   transmitting, by the base station, pilot signals for different cells;
   determining, by the base station, at least one control information feedback cycle;
   receiving, by the base station, control information groups including control information based on the at least one control information feedback cycle; and
   acquiring, by the base station, channel qualities by decoding the received control information groups,
   wherein a control information group corresponds to a cell,
   wherein a transmission power for each of the control information groups is controlled separately, based on a number of information bits of each of the control information groups, and
   wherein the control information is generated based on the pilot signals.

6. The control information reception method of claim 5, wherein one of the control information groups of which an error correction capability is less than an error correction capability of another control information group is transmitted with a power greater than a transmission power of the another control information group.

7. The control information reception method of claim 6, wherein acquiring channel qualities comprises decoding the control information group transmitted with high transmission power using a block code having a low error correction capability and the control information group transmitted with low transmission power using a block code having a high error correction capability.

8. The control information reception method of claim 5, wherein the control information groups comprise a first control information group including the control information of one of the cells and a second control information group including the control information of the rest of the cells.

9. A user equipment for a multi-cell transmission system in which N cells transmit packet data using different frequencies, the user equipment comprising:
   a transceiver; and
   a controller for controlling to receive, via the transceiver, pilot signals for different cells, to generate at least two control information indicating channel qualities for the different cells based on the received pilot signals, to classify the at least two control information into two control information groups according to a predetermined rule, to separately control transmission power of each of the control information groups based on a number of information bits of each of the control information groups, and to transmit, via the transceiver, each of the power controlled control information groups on a different corresponding channel.

10. The user equipment of claim 9, wherein the controller controls to set a transmission power of one of the control information groups of which an error correction capability is less than an error correction capability of another control information group, to a value greater than a transmission power of the another control information group.

11. The user equipment of claim 9, wherein the controller controls to classify one of the at least two control information into a first control information group and the rest of the at least two control information into a second control information group.

12. The user equipment of claim 9, wherein the controller controls to transmit the control information groups based on at least one control information feedback cycle.

13. A base station for a multi-cell transmission system in which N cells transmit packet data using different frequencies, the base station comprising:
   a transceiver; and
   a controller for controlling to transmit, via the transceiver, pilot signals for different cells, to determine at least one control information feedback cycle, to receive control information groups including control information based on the at least one control information feedback cycle, and to acquire channel qualities by decoding the received control information groups,
   wherein a control information group corresponds to a cell,
   wherein a transmission power for each of the control information groups is controlled separately, based on a number of information bits of each of the control information groups, and
   wherein the control information is generated based on the pilot signals.

14. The base station of claim 13, wherein one of the control information groups of which error correction capability is less than an error correction capability of another control information group is transmitted with a power greater than a transmission power of the another control information group.

15. The base station of claim 13, wherein the control information groups comprise a first control information group including the control information of one of the cells and a second control information group including the control information of the rest of the cells.

\* \* \* \* \*